US007506342B2

(12) United States Patent
Mousseau et al.

(10) Patent No.: US 7,506,342 B2
(45) Date of Patent: Mar. 17, 2009

(54) SYSTEM AND METHOD FOR IMPLEMENTING J2EE CONNECTOR ARCHITECTURE

(75) Inventors: Richard Mousseau, Stratham, NH (US); Prasenjit Mukherjee, Karnataka (IN); Deborah C. June, Groton, MA (US)

(73) Assignee: BEA Systems, Inc., Redwood Shores, CA (US)

( * ) Notice: Subject to any disclaimer, the term of this patent is extended or adjusted under 35 U.S.C. 154(b) by 811 days.

(21) Appl. No.: 10/617,909

(22) Filed: Jul. 11, 2003

(65) Prior Publication Data

US 2004/0078495 A1 Apr. 22, 2004

Related U.S. Application Data

(60) Provisional application No. 60/397,916, filed on Jul. 23, 2002.

(51) Int. Cl.
*G06F 3/00* (2006.01)
*G06F 9/44* (2006.01)
*G06F 9/46* (2006.01)
*G06F 13/00* (2006.01)

(52) U.S. Cl. ........................................................ 719/320

(58) Field of Classification Search ......... 719/310–320, 719/328–330
See application file for complete search history.

(56) References Cited

U.S. PATENT DOCUMENTS 4,714,996 A 12/1987 Gladney et al.
5,163,148 A 11/1992 Walls
5,212,793 A 5/1993 Donica et al. ............... 395/700
5,249,290 A 9/1993 Heizer ........................ 395/650
5,613,060 A 3/1997 Britton ........................ 714/15
5,761,507 A 6/1998 Govett ........................ 395/684
5,765,171 A 6/1998 Gehani ........................ 707/203
5,768,504 A 6/1998 Kells et al. ............. 395/187.01
5,774,689 A 6/1998 Curtis et al.
5,802,291 A 9/1998 Balick et al. ........... 395/200.32
5,805,798 A 9/1998 Kearns et al.

(Continued)

OTHER PUBLICATIONS

Stearns, Using the J2EE Connector Architecture Common Client Interface, Sun, Apr. 2001, pp. 1-10.*

(Continued)

*Primary Examiner*—Li B Zhen
*Assistant Examiner*—Diem K Cao
(74) *Attorney, Agent, or Firm*—Fliesler Meyer LLP

(57) ABSTRACT

Systems and methods in accordance with the present invention improve upon standard J2EE Connector Architecture implementations by adding functionality not included in the Architecture specification. An improved implementation can include, for example, packaging and development interfaces that allow any J2EE-compliant resource adapter to plug into J2EE applications in a modular manner. A connection manager can provide a scalable application environment that can support a large number of clients requiring access to an EIS. A connection manager can also provide active connection pool management and deployment. A transaction manager can allow transaction management across multiple resource managers, while a resource adapter can provide support for integrated error logging and tracing. A password converter tool can be used with the security management contract to parse and encrypt any passwords in the deployment descriptor.

This description is not intended to be a complete description of, or limit the scope of, the invention. Other features, aspects, and objects of the invention can be obtained from a review of the specification, the figures, and the claims.

19 Claims, 3 Drawing Sheets

U.S. PATENT DOCUMENTS

| | | | | |
|---|---|---|---|---|
| 5,819,107 | A | 10/1998 | Lichtman et al. | |
| 5,909,689 | A | 6/1999 | Van Ryzin | 707/203 |
| 5,910,180 | A | 6/1999 | Flory et al. | |
| 5,926,775 | A | 7/1999 | Brumley et al. | |
| 6,018,805 | A | 1/2000 | Ma | 714/4 |
| 6,055,243 | A | 4/2000 | Vincent et al. | |
| 6,122,629 | A | 9/2000 | Walker | 707/8 |
| 6,134,673 | A | 10/2000 | Chrabaszcz | 714/13 |
| 6,173,327 | B1 | 1/2001 | De Borst et al. | |
| 6,189,046 | B1 | 2/2001 | Moore et al. | |
| 6,212,521 | B1 | 4/2001 | Minami et al. | |
| 6,212,556 | B1 | 4/2001 | Arunachalam | |
| 6,243,753 | B1 | 6/2001 | Machin et al. | |
| 6,269,373 | B1 | 7/2001 | Apte et al. | |
| 6,338,089 | B1 | 1/2002 | Quinlan | 709/227 |
| 6,343,287 | B1 | 1/2002 | Kumar et al. | 707/4 |
| 6,389,462 | B1 | 5/2002 | Cohen | 709/218 |
| 6,411,956 | B1 | 6/2002 | Ng | 707/10 |
| 6,425,005 | B1 | 7/2002 | Dugan | 709/223 |
| 6,438,705 | B1 | 8/2002 | Chao | 714/4 |
| 6,453,356 | B1 | 9/2002 | Sheard et al. | |
| 6,466,972 | B1 | 10/2002 | Paul et al. | |
| 6,505,200 | B1 | 1/2003 | Ims et al. | |
| 6,505,241 | B2 | 1/2003 | Pitts | 709/218 |
| 6,523,130 | B1 | 2/2003 | Hickman | 714/4 |
| 6,539,381 | B1 | 3/2003 | Prasad et al. | |
| 6,542,845 | B1 | 4/2003 | Grucci et al. | 702/122 |
| 6,687,848 | B1 | 2/2004 | Najmi | 714/4 |
| 6,721,777 | B1 * | 4/2004 | Sharma | 718/101 |
| 6,757,708 | B1 | 6/2004 | Craig et al. | |
| 6,775,703 | B1 | 8/2004 | Burns | 709/228 |
| 6,779,017 | B1 | 8/2004 | Lamberton et al. | |
| 6,826,601 | B2 | 11/2004 | Jacobs | 709/217 |
| 6,832,238 | B1 * | 12/2004 | Sharma et al. | 709/201 |
| 6,854,120 | B1 | 2/2005 | Lo | |
| 6,944,785 | B2 | 9/2005 | Gadir | 714/4 |
| 6,963,857 | B1 | 11/2005 | Johnson | |
| 7,089,584 | B1 | 8/2006 | Sharma | |
| 7,100,195 | B1 | 8/2006 | Underwood | |
| 2001/0042073 | A1 | 11/2001 | Saether et al. | |
| 2001/0054062 | A1 | 12/2001 | Ismale et al. | |
| 2002/0073188 | A1 | 6/2002 | Rawson | |
| 2002/0147961 | A1 * | 10/2002 | Charters et al. | 717/101 |
| 2002/0161839 | A1 | 10/2002 | Colasurdo et al. | |
| 2002/0188591 | A1 | 12/2002 | Santosuosso | |
| 2003/0037181 | A1 | 2/2003 | Freed | |
| 2003/0041135 | A1 | 2/2003 | Keyes et al. | |
| 2003/0051102 | A1 | 3/2003 | Jacobs et al. | |
| 2003/0060214 | A1 | 3/2003 | Hendrey et al. | |
| 2003/0065708 | A1 | 4/2003 | Jacobs et al. | |
| 2003/0088713 | A1 | 5/2003 | Mandal et al. | |
| 2003/0158908 | A1 | 8/2003 | Jacobs et al. | |
| 2003/0233433 | A1 | 12/2003 | Halpern | |
| 2003/0236923 | A1 * | 12/2003 | Jeyaraman et al. | 709/318 |
| 2004/0059735 | A1 | 3/2004 | Gold et al. | |
| 2004/0153558 | A1 | 8/2004 | Gunduc et al. | |
| 2004/0230747 | A1 | 11/2004 | Ims et al. | |
| 2006/0168118 | A1 | 7/2006 | Godlin et al. | |
| 2006/0212453 | A1 | 9/2006 | Eshel et al. | |

OTHER PUBLICATIONS

Marinescu, Bea Weblogic Server 6.1 has been released, TheServerSide.com. p. 1.*

Flowers, The J2EE Connector Architecture, May 1, 2001, pp. 1-4.*

Rana et al, Java Function, Intelligent Enterprise, Apr. 16, 2001, pp. 1-9.*

Stanhope, J2EE Connector Architecture Promises to Simplify Connection to Back-End Systems, Giga Information Group, Nov. 16, 2000, p. 1-4.*

Sarathy et al, Integrating Java Application with the Enterprises, EAI Journal, May 2001, pp. 50-54.*

Bea Systems, WebLogic Server 6.1, Sep. 19, 2001.*

Rodoni, The J2EE Connector Architecture's Resource Adapter, Sun Systems, Dec. 2001, pp. 1-12.*

Marinescu, Bea Weblogic Server 6.1 has been released, TheServerSide.com, Jul. 31, 2001, p. 1.*

Newport, Billy, JMX, 2001, http://www.theserverside.com/articles/article.tss?1=JMX.

Kooijmans, Enterprise JavaBeans for z/OS and OS/390 WebSphere Application Server V4.0; 2001, p. 31-78, 185-240.

Bainbridge, "CICS and Enterprise JavaBeans," 2001, v. 40, No. 1, p. 1-19.

Visveswaran, Siva, "Dive into connection pooling with J2EE", http://java.sun.com/developer/technicalarticles/J2EE/pooling/index.html, Reprinted from JavaWorld, Oct. 2000, pp. 1-7.

BEA Systems, Inc., "BEA Unveils BEA WebLogic Server 6.0, the Next Generation of the World's Number One Java Application Server," Press Release, Dec. 6, 2000, http://www.bea.com/framework.jsp?CNT=pr00281.htm&FP=/content/news_events/press_releases/2000.

BEA Systems, Inc., "BEA Drives Next-Generation E-Business Integration Solution with Support for J2EE Connector Architecture," Press Release, Feb. 12, 2001, http://www.bea.com/framework.jsp?CNT=pr00530.htm&FP=/content/news_events/press_releases/2001.

BEA Systems, Inc., "BEA Announces WebLogic Integration for Dramatically Simplified Enterprise Integration," Press Release, Jun. 4, 2001, http://www.bea.com/framework.jsp?CNT=pr00593.htm&FP=/content/news_events/press_releases/2001.

BEA Systems, Inc., "BEA Ships Web Services Release of the World's #1 Java Application Server, BEA WebLogic Server 6.1," Press Release, Aug. 1, 2001, http://www.bea.com/framework.jsp?CNT=pr00634.htm&FP=/content/news_events/press_releases/2001.

BEA Systems, Inc., "BEA WebLogic Server™ 6.0," http://edocs.bea.com/wls/docs60/index.html, last updated May 2001.

BEA Systems, Inc., "BEA WebLogic Server™ 6.1," http://edocs.bea.com/wls/docs61/index.html, last updated Sep. 2004.

BEA Systems, Inc., "Programming the J2EE Connector Architecture," WebLogic Server 6.1, http://edocs.bea.com/wls/docs61/jconnector/index.html, 2001.

J2EE™ Connector Architecture and Enterprise Application Integration (Rahul Sharma et al., eds.), Chapter 18: "Embracing the J2EE Connector Architecture: The BEA WebLogic Experience," by Deb June, et al., Prentice Hall, Dec. 14, 2001.

BEA Systems, Inc., WebLogic J2EE Connector Architecture Beta Implementation, http://e-docs.bea.com/wls/jconnector/Release_Notes.html, 2001.

BEA Systems, Inc., Connection Management, WebLogic Server 6.1, 2001, pp. 1-3, http://e-docs.bea.com/wls/docs61/jconnector/connect.html.

* cited by examiner

SYSTEM AND METHOD FOR IMPLEMENTING J2EE CONNECTOR ARCHITECTURE

CLAIM OF PRIORITY

This application claims priority to U.S. Provisional Patent Application No. 60/397,916, filed Jul. 23, 2002, entitled "System and Method for Implementing J2EE Connector Architecture".

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

CROSS-REFERENCED CASES

The following applications are cross-referenced and incorporated herein by reference:

U.S. Provisional Application No. 60/354,738 entitled "J2EE COMPONENT EXTENSION ARCHITECTURE," by Richard Mousseau et al., filed Feb. 6, 2002.

U.S. Provisional Application No. 60/335,633 entitled "SYSTEM AND METHOD FOR FLUSHING BEAN CACHE," by Dean Jacobs et al., filed Oct. 25, 2001.

U.S. Provisional Application No. 60/317,718 entitled "EXACTLY ONCE CACHE FRAMEWORK," by Dean Jacobs et al., filed Sep. 6, 2001.

U.S. Provisional Application No. 60/317,566 entitled "EXACTLY ONCE JMS COMMUNICATION," by Dean Jacobs et al., filed Sep. 6, 2001.

FIELD OF THE INVENTION

The present invention relates to the integration of application servers and enterprise information systems.

BACKGROUND

The functionality of an application server can take advantage of an implementation of the J2EE Platform Specification, as set forth by Sun Microsystems of Santa Clara, Calif. The J2EE Connector Architecture adds simplified Enterprise Information System (EIS) integration to Sun's Java 2 Platform, Enterprise Edition (J2EE platform). The goal is to leverage the strengths of the J2EE platform, including component models, transaction and security infrastructures, in order to address the challenges of EIS integration.

The J2EE Connector Architecture provides a Java solution to the problem of connectivity between the multitude of application servers and EISes. By using the Connector Architecture, it is no longer necessary for EIS vendors to customize their product for each application server. By conforming to the J2EE Connector Architecture, an application server does not require added custom code in order to extend its support connectivity to a new EIS.

The Connector Architecture enables an EIS vendor to provide a standard resource adapter for the vendor's EIS. This resource adapter can plug into an application server and provide the underlying infrastructure for the integration between an EIS and the application server.

By supporting the Connector Architecture, an application server can be assured of connectivity to multiple EISes. In turn, EIS vendors must provide only one standard Connector Architecture-compliant resource adapter that has the capability to plug into that application server.

The J2EE Connector Architecture can be implemented in an application server and an EIS-specific resource adapter. A resource adapter is a system library specific to an EIS and provides connectivity to the EIS. A resource adapter is analogous to a JDBC driver. The interface between a resource adapter and the EIS is specific to the underlying EIS and can be a native interface.

The J2EE Connector Architecture is a flexible standard architecture that is high-level, or generic, enough to allow it to be implemented for a number of different applications or purposes on a number of different systems. As such, there is often a need to build additional functionality or make improvements when implementing the Connector Architecture for a specific application server.

BRIEF SUMMARY

Systems and methods in accordance with embodiments of the present invention can improve upon standard J2EE Connector Architecture implementations by adding functionality not included in the specification for the Architecture. An improved implementation in accordance with one embodiment of the present invention includes a resource adapter for an Enterprise Information System, as well as a set of system-level contracts between the resource adapter and the application server hosting the implementation. A Common Client Interface (CCI) can be used to provide a client API for Java applications and development tools to access the resource adapter.

A set of packaging and development interfaces can be used to provide the ability for resource adapters to plug into J2EE applications in a modular manner, capable of supporting any resource adapter capable of being deployed in an application server supporting the J2EE Platform Specification. The set can include contracts for connection management, transaction management, and security management. The contract for connection management can provide the application server with several pool connections to underlying Enterprise Information Systems. The connection management contract can also allow an application component on the application server to connect to an Enterprise Information System, providing the application server with a scalable application environment that can support a large number of clients requiring access to Enterprise Information Systems.

A transaction manager can be used with the transaction management contract that is capable of supporting transaction access to resource managers for the Enterprise Information System. The transaction management contract can allow the application server to use the transaction manager to manage transactions across multiple resource managers.

A resource adapter module can be created that includes the resource adapter, as well as native libraries specific to the underlying Enterprise Information System and a deployment descriptor for the resource adapter. The deployment descriptor can be used in deploying and managing the resource adapter on the application server, and is specific to the application server, defining operational parameters unique to the application server. The resource adapter can be deployed dynamically on the application server. The resource adapter can provide support for error logging and tracing, and the deployment descriptor can contain a logging-enabled element capable of indicating whether logging is enabled, as well as a log-filename element capable of specifying the name of the file in which to write the logging information.

A connection manager can be used that enables the resource adapter to provide services specific to the resource adapter, such as connection pooling, error logging and tracing, and security management. The connection manager can create physical connections to the underlying Enterprise Information System. The resource adapter is capable of having more than one connection manager instance per physical connection. The deployment descriptor allows the resource adapter to be linked to a second resource adapter, preventing the duplication of resources and only requiring the resource adapter to create and/or modify a subset of resource adapter attributes.

A password converter tool can be used with the security management contract to encrypt any passwords in the deployment descriptor. The password converter tool can parse an existing deployment descriptor containing non-encrypted passwords and create a new deployment descriptor containing encrypted passwords.

A connection manager on the application server can manage and maintain the size of the pool of connections to an Enterprise Information System. The connection manager can try to match a request for a new connection to an Enterprise Information System, through the resource adapter, with an existing and available managed connection in the pool of connections. The connection manager can create a number of managed connections when an existing and available managed connection is not found, each of which use the initiating principal and client request information contained in the request for a new connection. The connection manager can also attempt to recycle a managed connection from the connection pool if a maximum number of connections is reached. The connection manager can monitor the activity of managed connections in the connection pool during the deployment of a resource adapter, and can reduce the size of the connection pool if connection usage decreases and remains at the decreased level over a period of time. The connection manager can also automatically close a managed connection that has exhausted its usage time.

Other features, aspects, and objects of the invention can be obtained from a review of the specification, the figures, and the claims.

DETAILED DESCRIPTION

Systems and methods in accordance with embodiments of the present invention can not only be used to implement the J2EE Connector Architecture for a specific application server, but also can add functionality and make improvements to standard implementations. Such additional functionality includes, but is not limited to: console integration through configuration and runtime MBean support, dynamic deployment of resource adapter connection pools, integrated logging, and pool management through the pre-allocation and active management of resource adapter connections.

A J2EE Connector Architecture implementation can have three main components. One such component is a set of system-level contracts between a resource adapter and an application server. A second main component is a Common Client Interface (CCI), which can provide a client API for Java applications and development tools to access the resource adapter. A third main component can include a set of packaging and development interfaces, which can provide the ability for various resource adapters to plug into J2EE applications in a modular manner.

Figure 1:
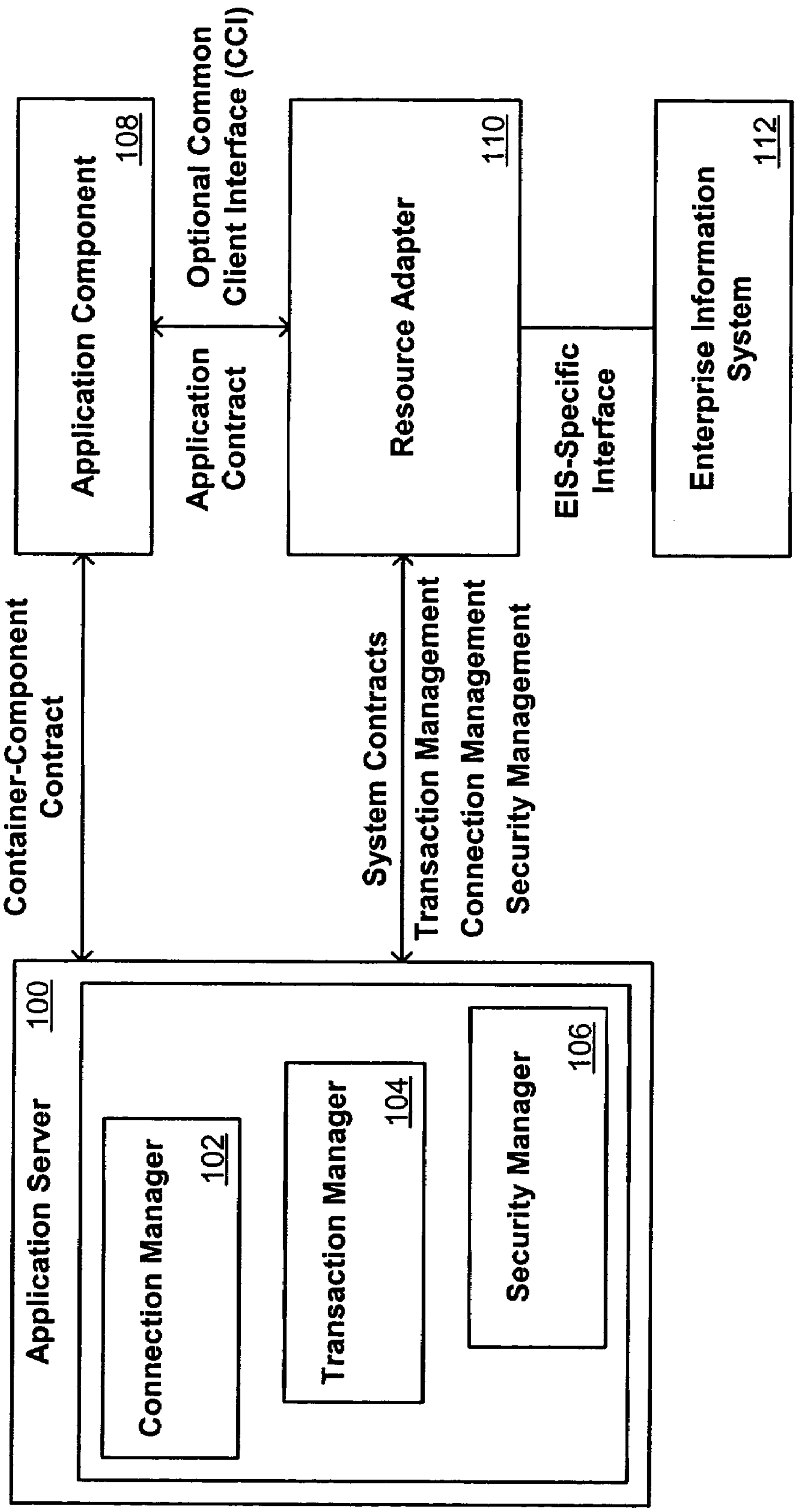
FIG. 1 is a diagram of a J2EE Connector Architecture implementation in accordance with one embodiment of the present invention.

FIG. 1 illustrates one implementation of the J2EE Connector Architecture. A resource adapter 110 serves as the "J2EE connector." An application server 100 contains components for connection management 102, transaction management 104, and security management 106. The application server has a container-component contract with an application component 108. The application server 100 also has system contracts with the resource adapter 110 for transaction, connection, and security management in communication with the respective components 104, 102, and 106. The application component 108 has an application contract with the resource adapter 110, and may have a common client interface as well. The resource adapter 100 can communicate with an Enterprise Information System 112 through an interface specific to that EIS 112.

An improved implementation of the J2EE Connector Architecture (herein after referred to simply as the "Implementation") supports resource adapters developed by Enterprise Information System (EIS) vendors and third-party application developers that can be deployed in any application server supporting the J2EE specification. Resource adapters contain the Java, and if necessary, the native components required to interact with the EIS.

The J2EE Connector Architecture specification defines a set of system-level contracts between a J2EE-compliant application server and an EIS-specific resource adapter. An application server, in compliance with this specification, can implement a set of defined standard contracts for connection management, transaction management, and security management.

A contract for connection management gives an application server pool connections to underlying EISes. The connection management contract also allows application components to connect to an EIS. This results in a scalable application environment that can support a large number of clients requiring access to EIS.

A contract for transaction management can be implemented between a transaction manager and an EIS supporting transaction access to EIS resource managers. The transaction management contract allows an application server to use a transaction manager to manage transactions across multiple resource managers. A security management contract can provide secure access to an EIS and can provide support for a secure application environment, reducing threats to the EIS and protecting information resources managed by the EIS.

Common Client Interface (CCI)

A Common Client Interface (CCI) defines a standard client application programming interface (API) for application components. The CCI enables application components and Enterprise Application Integration (EAI) frameworks to drive interactions across heterogeneous EISes using a common client API.

The target users of the CCI are typically enterprise tool vendors and EAI vendors. Application components themselves may also write to the API, although the CCI is a low-level API. A CCI can be the basis for richer functionality provided by the tool vendors, rather than being an application-level programming interface used by most application developers. Further, the CCI defines a remote function-call interface that focuses on executing functions on an EIS and retrieving the results. The CCI is independent of a specific EIS, but is capable of being driven by EIS-specific metadata from a repository.

The CCI enables applications running on an application server to create and manage connections to an EIS, execute an interaction, and manage data records as input, output or return values. The CCI is designed to leverage the JavaBeans architecture and Java Collection framework. The 1.0 version of the J2EE Connector Architecture recommends that a resource adapter support CCI as its client API, while it requires that the resource adapter implement the system contracts. A resource adapter may choose to have a client API different from CCI, such as the client API based on the Java Database Connectivity (JDBC) API.

Packaging and Deployment

Figure 2:
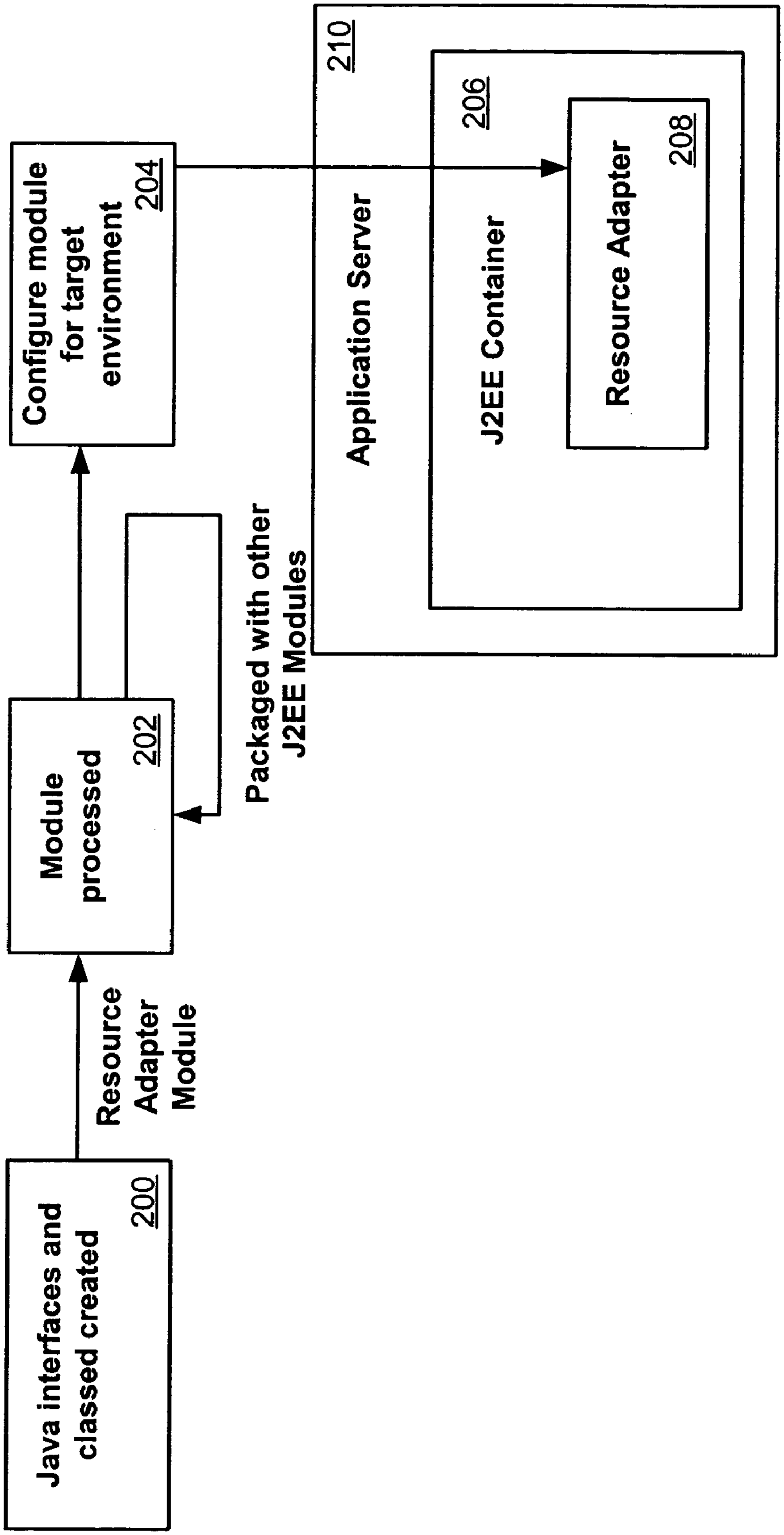
FIG. 2 is a diagram of exemplary packaging and deployment interfaces that can be used with the implementation of FIG. 1.

The implementation can include J2EE Connector Architecture packaging and deployment interfaces, so that various resources adapters can easily plug into a compliant J2EE application server in a modular manner. One example of this is shown in FIG. 2.

A resource adapter provider can develop a set of Java interfaces and classes as part of the implementation of a resource adapter 200. These Java classes can implement J2EE Connector Architecture-specified contracts and EIS-specific functionality provided by the resource adapter. The development of a resource adapter can also require use of native libraries specific to the underlying EIS.

Java interfaces and classes can be packaged together with a deployment descriptor, as well as with required native libraries, help files, documentation, and other resources, to create a Resource Adapter Module. A deployment descriptor can define the contract between a resource adapter provider and a deployer for the deployment of a resource adapter.

A resource adapter module can be processed 202 and deployed as a shared, stand-alone module or packaged as part of an application. The module can also be packaged with other J2EE modules during processing. During deployment, a resource adapter module can be installed to a J2EE Container 206 on an application server 210. The resource adapter 208 is also configured into the target operational environment 204. The configuration of a resource adapter can be based on the properties defined in the deployment descriptor as part of the resource adapter module.

Certain embodiments of an Implementation may only support serializable connection factories, and not referenceable-only connection factories. In addition, an implementation may not support entities such as the javax.resource.spi.security.GenericCredential credential-interface or the Kerbv5 authentication-mechanism-type. Specification of either of these values for the <authentication-mechanism> element in the ra.xml file for the resource adapter being deployed could then result in a failed deployment.

The file format for a packaged resource adapter module can define the contract between a resource adapter provider and deployer. A packaged resource adapter can include elements such as Java classes and interfaces that are required for the implementation of both the Connector Architecture contracts and the functionality of the resource adapter. Other elements include utility Java classes for the resource adapter, platform-dependent native libraries required by the resource adapter, help files and documentation, and descriptive meta information that ties the above elements together.

Deployment of a resource adapter can be similar to the deployment of Web applications, EJBs, and Enterprise applications. Like these deployment units, a resource adapter can be deployed in an exploded directory format or as an archive file. A resource adapter can be deployed dynamically using command line or through an administration console. A resource adapter can also be deployed automatically, while the application server is running, by copying the archive file or exploded directory into the applications directory of an application server domain. A resource adapter can also be deployed as part of an Enterprise Application, which is deployed in an archive file called an .ear file.

Also similar to Web Applications, EJBs, and Enterprise Applications, resource adapters can use two deployment descriptors to define their operational parameters. A deployment descriptor such as implementation-ra.xml is specific to the application server and defines operational parameters unique to the application server.

When deploying a resource adapter rar file or deployment directory, a name can be specified for the deployment unit, such as myResourceAdapter. This name can provide a shorthand reference to the resource adapter deployment that can be used later to undeploy or update the resource adapter. When deploying a resource adapter, the application server can implicitly assign a deployment name that matches the path and filename of the .rar file or deployment directory. This assigned name can be used to undeploy or update the resource adapter after the server has started.

The resource adapter deployment name can remain active in the application server until, for example, the server is rebooted. Undeploying a resource adapter does not necessarily remove the associated deployment name, because that name can be re-used at a later point in time to deploy the resource adapter.

Undeploying a resource adapter does not necessarily remove the resource adapter name from the application server. The resource adapter can remain undeployed for the duration of the server session, as long as it is not changed once it is undeployed. The deployment name can not be re-used with the deploy argument until the server is re-booted. The deployment name can be re-used to update the deployment, however.

When the contents of the resource adapter .rar file or deployment directory that has been deployed to the application server are updated, those updates are not reflected in the application server until the server is re-booted if the rar or directory is to be automatically deployed. Otherwise, the updates can be reflected when the resource adapter deployment is updated, such as by using the application server administration console.

A resource adapter can be deployed automatically while the application server is running. An "applications" directory can be monitored during runtime of the application server and can detect if a new .rar is added, causing deployment, or if an existing .rar is removed, causing undeployment.

To deploy a resource adapter using the applications directory, the .rar archive or exploded directory containing a resource adapter can be copied to the applications directory of a domain. For example, after copying a resource adapter called myResourceAdapter in exploded format, the application server installation can look like this, at least in part:

```
\---Home
    \—apperver
        \---config
            \---mydomain
                \---applications
                    \---myResourceAdapter
                        eis.jar
                        readme.html
                        unix.so
                        utilities.jar
                        windows.dll
                        \---META-INF
                            ra.xml
                            implementation-
                            ra.xml
```

After copying a .rar file, the application server installation can look like this:

```
\---Home
    \—appserver
        \---config
            \---mydomain
                \---applications
                    myResourceAdapter.rar
```

The application server can be started, can attempt to automatically deploy the specified resource adapter rar file or deployment directory when the server boots. If an administration console is being used, it can be verified that the resource adapter is listed and that the adapter is deployed.

Undeploying a resource adapter does not remove the resource adapter name from the application server. The resource adapter will remain undeployed for the duration of the server session, as long as it is not changed once it has been undeployed. The deployment name cannot be re-used with the deploy argument until the server is re-booted. The deployment name can be reused to update the deployment, however.

Resource Adapter Developer Tools

Several resource adapter developer tools can be provided to aid in the creation and configuring of resource adapters. For example, ANT Tasks or ANT utilities can be used to create skeleton deployment descriptors. These utilities can be implemented as Java classes, for example. An ANT task can look at a directory containing a resource adapter and create deployment descriptors based on the files the task finds in the resource adapter. Because the ANT utility does not have information about all of the desired configurations and mappings for a resource adapter, the skeleton deployment descriptors the utility creates can be incomplete. After the utility creates the skeleton deployment descriptors, a resource such as a text editor, an XML editor, or an administration console can be used to edit the deployment descriptors and complete the configuration of the resource adapter.

An administration console can be used on the application server that comes with an integrated deployment descriptor editor. At least one skeleton ra.xml deployment descriptor may need to be created before using this integrated editor. An XML editor can also be used, such as a simple, user-friendly tool from Ensemble for creating and editing XML files. The XML editor can validate XML code according to a specified DTD or XML Schema. The XML editor can be used on Windows or Solaris machines, for example.

Creating Resource Adapters

When writing a connection management contract, there can be certain requirements that must be addressed for a resource adapter. For example, a resource adapter may need to provide implementations of the following interfaces:

```
javax.resource.spi.ManagedConnectionFactory
javax.resource.spi.ManagedConnection
javax.resource.spi.ManagedConnectionMetaData
```

The ManagedConnection implementation provided by a resource adapter can use the following interface and classes to provide support to an application server for connection management, as well as transaction management:

```
javax.resource.spi.ConnectionEvent
javax.resource.spi.ConnectionEventListener
```

To support non-managed environments, a resource adapter may not be required to use the above two interfaces to drive its internal object interactions.

A resource adapter can be required to provide support for basic error logging and tracing by implementing methods such as the following:

```
ManagedConnectionFactory.set/getLogWriter
ManagedConnnection.set/getLogWriter
```

A resource adapter can also be required to provide a default implementation of the javax.resource.spi.ConnectionManager interface. The implementation class comes into play when a resource adapter is used in a non-managed two-tier application scenario. In an application server-managed environment, the resource adapter should not use the default ConnectionManager implementation class.

An application server implementation can make use of the ManagedConnectionFactory.set/getLogWriter from the J2EE specification to provide an error logging and tracing facility for a resource adapter. At least two elements can be provided in the implementation-ra.xml descriptor file to configure this feature for an application server. First, a logging-enabled element can indicate whether or not logging is enabled. The default value for this element can be false. Second, a log-filename element can specify the filename in which to write the logging information.

A default implementation of ConnectionManager can enable the resource adapter to provide services specific to itself. These services can include connection pooling, error logging and tracing, and security management. The default ConnectionManager can delegate to the ManagedConnectionFactory the creation of physical connections to the underlying EIS.

In a managed environment, a resource adapter may not be allowed to support its own internal connection pooling. In this case, the application server is responsible for connection pooling. However, a resource adapter may multiplex connections, or have one or more ConnectionManager instances per physical connection, over a single physical pipe transparent to the application server and components. In a non-managed two-tier application scenario, a resource adapter can be allowed to support connection pooling internal to the resource adapter.

Configuring Resource Adapters

The J2EE Connector Architecture enables both EIS vendors and third-party application developers to develop resource adapters that can be deployed in any application server supporting the J2EE specification. A resource adapter can be the central piece of an implementation. The resource adapter can serve as the J2EE connector between a client component and an EIS. When a resource adapter is deployed in the application server environment, the resource adapter can enable the development of robust J2EE applications that can access remote EIS systems. Resource adapters contain the Java components, and if necessary, the native components required to interact with the EIS.

Creating a resource adapter can require the creation of classes for the particular resource adapter, such as a ConnectionFactory or Connection resource adapter. It can also be necessary to create the connector-specific deployment descriptors, and package everything up into an jar file to be deployed to the application server.

In order to create a resource adapter (.rar), the Java code must first be written for the various classes required by resource adapter in accordance with the J2EE Connector Specification. When implementing a resource adapter, classes need to be specified in the ra.xml file. Examples include, for example:

```
<managedconnectionfactory-
class>com.sun.connector.blackbox.LocalTxManagedCo
nnectionFactory< /managedconnectionfactory-class>
<connectionfactory-
interface>javax.sql.DataSource< /connectionfactory-
interface>
<connectionfactory-impl-
class>com.sun.connector.blackbox.JdbcDataSource</
connectionfactory-impl-class>
<connection-
interface> java.sql.Connection< /connection-
interface>
<connection-impl-
class>com.sun.connector.blackbox.JdbcConnection</
connection-impl-class>
```

The Java code can be compiled for the interfaces and implementation into class files. The Java classes can be packaged into a Java archive (.jar) file, and the resource adapter-specific deployment descriptors can be created. One such deployment descriptor, ra.xml, can describe the resource adapter-related attributes type and its deployment properties using a standard DTD. Another deployment descriptor, implementation-ra.xml, can add additional application server-specific deployment information. If the resource adapter .rar does not contain an implementation-ra.xml file, the application server can be configured to automatically generate this file.

A resource adapter archive file (.rarfile) can be created. The first step can involve creating an empty staging directory. The .rar file containing the resource adapter Java classes can be placed in the staging directory. The deployment descriptors can be placed in a subdirectory, such as may be called META-INF. The resource adapter archive can then be created by executing a jar command in the staging directory such as, for example:

```
jar cvf myRAR.rar *
```

The .rar resource adapter archive file can be deployed on the application server, or it can be included in an enterprise archive (.ear) file to be deployed as part of an enterprise application.

It is also possible to modify an existing resource adapter. The following is an example of how to take an existing resource adapter (.rar) and modify it for deployment to an application server. This can involve adding the implementation-ra.xml deployment descriptor and repacking. A temporary directory can be created to stage the resource adapter. The resource adapter that will be deployed into the temporary directory can be copied, and the contents of the resource adapter archive can be extracted. The staging directory should now contain a jar file containing Java classes that implement the resource adapter, as well as a META-INF directory containing files such as Manifest.mf and ra.xml. The implementation-ra.xml file can be created, which is the Implementation-specific deployment descriptor for resource adapters. In this file, parameters for connection factories, connection pools, and security mappings can be specified. If the resource adapter .rar does not contain an implementation-ra.xml file, the application server can be configured to automatically generate this file.

The implementation-ra.xml file can be copied into the temporary directory's META-INF subdirectory. The META-INF directory can be located in the temporary directory where the rar file was extracted, or in the directory containing a resource adapter in exploded directory format. The resource adapter archive can be created, and the resource adapter deployed in the application server.

The following is an example of what an automatically-generated implementation-ra.xml file might look like:

```
<implementation-connection-factory-dd>
<connection-factory-name>__TMP__CFNAME__.\config
\mydomain\applications\whitebox-notx.rar</connection-
factory-name>
<jndi-name>___TMP__JNDINAME__.\config
\mydomain\applications\whitebox-notx.rar</jndi-name>
    <pool-params>
        <initial-capacity>0</initial-capacity>
        <max-capacity>1</max-capacity>
        <capacity-increment>1</capacity-
increment>
        <shrinking-enabled>false</shrinking-
enabled>
        <shrink-period-minutes>200</shrink-
period-minutes>
    </pool-params>
    <security-principal-map>
    </security-principal-map>
</implementation-connection-factory-dd>
```

The optional <ra-link-ref> element allows multiple deployed resource adapters to be associated with a single deployed resource adapter. In other words, resources already configured in a base resource adapter can be linked to another resource adapter, modifying only a subset of attributes. The <ra-link-ref> element avoids, where possible, the duplication of resources such as classes, .jar files, and image files, for example. Any values defined in the base resource adapter deployment are inherited by the linked resource adapter, unless otherwise specified in the <ra-link-ref> element. If the optional <ra-link-ref> element is used, either all or none of the values in the may need to be provided in the <pool-params> element. The <pool-params> element values are not partially inherited by the linked resource adapter from the base resource adapter.

In providing the values, a <max-capacity> element can be assigned the value of 0 (zero) using an editor such as a console deployment descriptor editor. This allows the linked resource adapter to inherit <poolparams> element values from the base resource adapter. Otherwise, the <max-capacity> element can be assigned any value other than 0 (zero). The linked resource adapter will then inherit no values from the base resource adapter. If this option is selected, all of the <pool-params> element values may need to be specified for the linked resource adapter.

Packaging Guidelines

A resource adapter can be an application server component contained in an .rar archive file within an "applications" directory. The deployment process can begin with the .rar file or a deployment directory, both of which contain the compiled resource adapter interfaces and implementation classes created by the resource adapter provider. Regardless of whether the compiled classes are stored in an .rar file or a deployment directory, they must reside in subdirectories that match their Java package structures.

Resource adapters can use a common directory format. This same format can be used when a resource adapter is packaged in an exploded directory format as an .rar file. A resource adapter can be structured as in the following example:

```
/META-INF/ra.xml
/META-INF/implementation-ra.xml
/images/ra.jpg
/readme.html
/eis.jar
/utilities.jar
/windows.dll
unix.so
```

Regarding files in a resource adapter, deployment descriptors such as ra.xml and implementation-ra.xml can be in a subdirectory called META-INF. The resource adapter can contain multiple jar files that contain the Java classes and interfaces used by the resource adapter, such as eis.jar and utilities.jar. The resource adapter can contain native libraries required by the resource adapter for interacting with the EIS, such as windows.dII and unix.so. The resource adapter can include documentation and related files not directly used by the resource adapter, such as readme.html and /images/ra.jpg.

One or more resource adapters can be staged in a directory and then packaged in a jar file. To stage and package a resource adapter, a temporary staging directory can be created and the resource adapter Java classes can be compiled or copied into the staging directory. A .jar file can be created to store the resource adapter Java classes, and can be added to the top level of the staging directory. A META-INF subdirectory can be created in the staging directory, an ra.xml deployment descriptor can be created in the META-INF subdirectory, and entries can be added for the resource adapter. An implementation-ra.xml deployment descriptor can be created in the META-INF subdirectory and entries added for the resource adapter. When all of the resource adapter classes and deployment descriptors are set up in the staging directory, the resource adapter JAR file can be created that can be deployed on an application server or package in an application JAR file.

If there is no ra.xml file, one must be created or an existing one edited to set the necessary deployment properties for the resource adapter. A text editor can be used to edit the properties.

The implementation-ra.xml file can contain information required for deploying a resource adapter in an application server. In this file, certain attributes must be specified. This functionality can be consistent with the equivalent .xml extensions for EJBs and Web applications in the application server, which can also add Implementation-specific deployment descriptors to the deployable archive.

As is, a basic rar or deployment directory may not be capable of being deployed to an application server. Application server-specific deployment properties must first be created and configured in the implementation-ra.xml file, and that file must be added to the deployment. The implementation-ra.xml file defines such entities as the connection factory, connection pool parameters, and security principal mapping parameters.

The implementation-ra.xml file can contain information required for deploying a resource adapter in the application server. In this file, several attributes can be specified. For example, the name of the connection can be specified, as well as descriptive text about the connection factory and a JNDI name bound to a connection factory. A reference to a separately deployed connection factory can be specified that contains resource adapter components that can be shared with the current resource adapter. The directory where all shared libraries should be copied can be specified. Connection pool parameters can be specified that set behavior such as the initial number of managed connections the application server attempts to allocate at deployment time, the maximum number of managed connections the application server allows to be allocated at any one time, and the number of managed connections the application server attempts to allocate when filling a request for a new connection.

Other behavior that can be specified includes whether the application server attempts to reclaim unused managed connections to save system resources. The time the application server waits between attempts to reclaim unused managed connections can be specified, as well as the frequency of time to detect and reclaim connections that have exceeded their usage time. The amount of usage time allowed for a connection can also be specified.

Other such attributes include values for configuration properties defined in a <config-entry> element of the J2EE resource adapter deployment descriptor, ra.xml. Mapping of security principals for Resource Adapter/EIS sign-on processing can be specified. This mapping identifies resource principals to be used when requesting EIS connections for applications that use container-managed security and for EIS connections requested during initial deployment. A flag can be set to indicate whether logging is required for the ManagedConnectionFactory or ManagedConnection. A file can be specified to store logging information for the ManagedConnectionFactory or ManagedConnection.

Including a Resource AdaDter in an Enterprise Application (.ear file)

As part of the J2EE specification, a resource adapter archive (.rar) file can be included inside an Enterprise Application archive (.ear), and the application can be deployed in an application server. To deploy an Enterprise application that contains a resource adapter archive, the rar file can be placed inside the ear archive, similar to a war or jar archive. A valid application.xml can be created and placed in the META-INF directory of the .ear archive. When creating an application.xml, the application deployment descriptor can contain the new <connector> element to identify the resource adapter archive within the .ear archive. Because the <connector> element is a new addition to the J2EE Platform Specification, the application.xml file may need to contain the following DOCTYPE entry to identify it as a J2EE Platform Specification deployment descriptor:

```
<!DOCTYPE application PUBLIC '-//Sun Microsystems,
Inc.//DTD
J2EE Application 1.3//EN'
'http://java.sun.com/dtd/application_1_3.dtd'>
```

If this DOCTYPE entry is not used, the resource adapter may not be deployed. The following is an example of an application.xml file:

```
<application>
    <display-name>
        ConnectorSampleearApp
    </display-name>
    <module>
        <connector>RevisedBlackBoxNoTx.rar</co
        nnector>
    </module>
    <module>
        <ejb>ejb_basic_beanManaged.jar</ejb>
    </module>
</application>
```

Configuring the Security Principal Map

To use container-managed sign-on, an application server can identify a resource principal and request the connection to the EIS on behalf of the resource principal. In order to make this identification, the application server can look for a security principal map that is specified with an element such as <security-principal-map> in the implementation-ra.xml deployment descriptor file. Such a map can build associations between the application server initiating principals and resource principals. The initiating principals can be application server users with identities defined in an Implementation security realm, and resource principals can be users known to the resource adapter/EIS system. In addition, a <security-principal-map> can enable a user to define a default initiating principal that can be mapped to an appropriate resource principal when the initiating principal identified at run time is not found in the mapping. The default initiating principal can be established in the <security-principal-map> element with an<initiating-principal> element that has a value of *, such as:

```
<initiating-principal>*</initiating-principal>
```

A corresponding <resource-principal> entry can be included in the <security-principal-map> element that specifies a username and password. The following example shows an association between an application server initiating-principal and a resource-principal.

```
<security-principal-map>
    <map-entry>
        <initiating-principal>*</initiating-principal>
        <resource-principal>
            <resource-username>default</resource-
            username>
            <resource-password>try</resource-
            password>
        </resource-principal>
    </map-entry>
</security-principal-map>
```

This default initiating principal mapping can also be used at deployment time if the connection pool parameters indicate that the application server should initialize connections. The absence of a default initiating principal entry or the absence of a <security-principal-map> element may prevent the application server from creating connections using container-managed security.

Security

As specified in the J2EE Connector Specification, an implementation can support both container-managed and application-managed sign-on. At runtime, the implementation can determine the chosen sign-on mechanism, based upon information specified in the deployment descriptor of the invoking client. If the Implementation is unable to determine the sign-on mechanism being requested by the client component, such as may be due to an improper JNDI lookup of the resource adapter connection factory, the Connector Architecture can attempt container-managed sign-on. Even in this case, if the client component has specified explicit security information, this information is presented on the call to obtain the connection.

With application-managed sign-on, the client component can provide the necessary security information, such as a username and password, when making the call to obtain a connection to an EIS. In this scenario, the application server provides no additional security processing other than to pass this information along on the request for the connection. The provided resource adapter can use the client component-provided security information to perform the EIS sign-on in a resource adapter implementation specific manner.

With container-managed sign-on, the client component does not need to present any security information. The container can determine the necessary sign-on information and provide this information to the resource adapter when making a call to request a connection. In all container-managed sign-on scenarios, the container can be required to determine an appropriate resource principal and provide this resource principal information to the resource adapter in the form of a Java Authentication and Authorization Service (JAAS) Subject.

The "EIS Sign-on" section of the J2EE Connector Specification identifies a number of possible options for defining a resource principal on whose behalf the sign-on is being performed. An application server implementation can utilize a security principal map option identified in the specification. Under this option, a resource principal is determined by mapping from the identity of the initiating/caller principal for the invoking component. The resultant resource principal does not inherit the identity or security attributes of the principal that it is mapped from, but instead gets its identity and security attributes (password) based upon the defined mapping.

Therefore, in order to enable and use container-managed sign-on, an application server must provide a mechanism to specify the initiating-principal to resource-principal association. The implementation does this through a security principal map that can be defined for each deployed resource adapter, such as by a security-principal-map element in the implementation-ra.xml deployment descriptor file. If container-managed sign-on is requested by the client component and no security principal map is configured for the deployed resource adapter, an attempt can be made to obtain the connection, but the provided JMS Subject will be NULL. Support for this scenario can be based upon the resource adapter implementation.

A scenario in which omitting configuration of a security principal map might be considered valid is the case in which a resource adapter internally obtains all of its EIS connections with a hard-coded and pre-configured set of security information, and therefore does not depend on the security information passed to it on requests for new connections. This can be thought of as a third scenario, outside of application-managed sign-on and container-managed sign-on.

While the defined connection management system contracts define how security information is exchanged between an application server and the provided resource adapter, the determination of whether to use container-managed sign-on or application-managed sign-on can be based on deployment information defined for the client application that is requesting a connection.

A security-principal-map element defines the relationship of initiating-principal to a resource-principal. Each security-principal-map element can provide a mechanism to define appropriate resource principal values for resource adapter and EIS sign-on processing. The security-principal-map elements allow you to specify a defined set of initiating principals and the corresponding resource principal's username and password to be used when allocating managed connections and connection handles.

A default resource principal can be defined for the connection factory in the security-principal-map element. If an initiating-principal value of '*' and a corresponding resource-principal value is specified, the defined resource-principal can be utilized whenever the current identity is not matched elsewhere in the map. This is an optional element. It must be specified in some form if container-managed sign-on is supported by the resource adapter and used by any client. In addition, the deployment-time population of the connection pool with managed connections can be attempted using the defined 'default' resource principal if one is specified.

Security Management

Security management contract requirements for a resource adapter can include the requirement that the resource adapter support the security contract by implementing a method such as ManagedConnectionFactory.createManagedConnection. The resource adapter is not required to support re-authentication as part of its ManagedConnection.getConnection method implementation. The resource adapter can be required to specify its support for the security contract as part of its deployment descriptor. The relevant deployment descriptor elements can include elements such as authentication-mechanism, authentication-mechanism-type, reauthentication-support and credential-interface.

Security Converter

Because current configuration and packaging requirements for resource adapters in an application server require manual editing of the implementation-ra.xml file, any new passwords specified in the security-principal-map entries can be done in clear-text. Because of the importance of protecting security passwords, a converter tool can be used that allows for the encryption of all passwords present in the implementation-ra.xml file. If a resource adapter is required to have clear-text passwords that do not exist in the application server environment, the resultant implementation-ra.xml file must be post-processed using the converter tool each time a new clear-text password is added.

The provided password converter tool can be run to convert all resource-password values that are in clear text to encrypted password values. This converter tool can parse an existing implementation-ra.xml file containing clear-text passwords and create a new implementation-ra.xml file that contains encrypted passwords. This new file can be packaged in the .rar file for deployment to the application server.

Configuring the Transaction Level Type

Transactional access to an EIS can be an important requirement for many business applications. The J2EE Connector Architecture supports the concept of transactions, or a number of operations that must be committed together, or not at all, for the data to remain consistent and to maintain data integrity. An implementation built on the J2EE Connector Architecture can utilize a transaction manager that supports resource adapters having various transaction support levels.

There can be certain transaction management contract requirements for a resource adapter. The transaction level type supported by the resource adapter can be specified in the ra.xml deployment descriptor file. To specify the transaction support level for a level of "No Transaction", a

```
<transaction-support>
    NoTransaction
</transaction-support>
```

entry can be added to the ra.xml deployment descriptor file. For a level of "XA Transaction", a

```
<transaction-support>
    XATransaction
</transaction-support>
```

entry can be added. For a level of "Local Transaction", a

```
<transaction-support>
    LocalTransaction
</transaction-support>
```

entry can be added.

A resource adapter can be classified based on the level of transaction support, such as a level of "NoTransaction", in which the resource adapter supports neither resource manager local nor JTA transactions, and implements neither XAResource nor LocalTransaction interfaces. A level of "LocalTransaction" can signify that the resource adapter supports resource manager local transactions by implementing the LocalTransaction interface. A level of "XATransaction" signifies that the resource adapter supports both resource manager local and JTA transactions by implementing LocalTransaction and XAResource interfaces respectively.

These levels can reflect the major steps of transaction support that a resource adapter may need to make to allow external transaction coordination. Depending on its transaction capabilities and requirements of its underlying EIS, a resource adapter can choose to support any of the above transaction support levels.

An "XA Transaction" support level can allow a transaction to be managed by a transaction manager external to a resource adapter, and therefore external to an EIS. A resource adapter defines the type of transaction support by specifying the transaction-support element in the ra.xml file. A resource adapter can typically only support one type. When an application component demarcates an EIS connection request as part of a transaction, the application server can be responsible for enlisting the XA resource with the transaction manager. When the application component closes that connection, the application server can de-list the XA resource from the transaction manager and clean up the EIS connection once the transaction has completed.

"Local Transaction" support allows an application server to manage resources that are local to the resource adapter. Unlike XA transaction support, it cannot participate in a two-phase commit protocol. A resource adapter can define the type of transaction support by specifying the transaction-support element in the resource adapter ra.xml file. A resource adapter can typically only support one type. When an application component requests an EIS connection, the application server can start a local transaction based on the current transaction context. When the application component closes that connection, the application server can do a commit on the local transaction and can clean up the EIS connection once the transaction has completed.

A "No Transaction" support level can be used, for example, if a resource adapter does not support XA or Local Transaction support. If an application component needs to use that resource adapter, the application component must not involve any connections to the EIS in a transaction that are represented by that resource adapter. However, if an application component needs to involve EIS connections in a transaction, the application component must interact with a resource adapter that supports XA or Local Transactions. The resource adapter can specify which kind of transaction it supports in an ra.xml deployment descriptor file.

In many cases, a (local) transaction is limited in scope to a single EIS system, and the EIS resource manager itself manages such a transaction. An XA transaction or global transaction can typically span multiple resource managers. This form of transaction requires transaction coordination by an external transaction manager, which can be bundled with an application server. A transaction manager can use a two-phase commit protocol to manage a transaction that spans multiple resource managers or EISes. One-phase commit optimization can be used if only one resource manager is participating in an XA transaction.

The J2EE Connector Architecture defines a transaction management contract between an application server and a resource adapter, as well as its underlying resource manager. The transaction management contract extends the connection management contract and provides support for management of both local and XA transactions. The transaction management contract can have two parts, depending on the type of transaction. One such part is a JTA XAResource-based contract between a transaction manager and an EIS resource manager. Another such part is a local transaction management contract.

These contracts can enable an application server to provide the infrastructure and runtime environment for transaction management. Application components rely on this transaction infrastructure to support the component level transaction model. Because EIS implementations are so varied, the transactional support must be very flexible. The J2EE Connector Architecture imposes no requirements on the EIS for transaction management. Depending on the implementation of transactions within the EIS, a resource adapter may provide no transaction support at all, which is typical of legacy applications and many back-end systems, support for only local transactions, or support for both local and XA transactions. An application server can support all three levels of transactions, ensuring its support of EISes at different transaction levels.

Configuring Connection Properties

An ra.xml deployment descriptor file can contain a config-property element to declare a single configuration setting for a ManagedConnectionFactory instance. The resource adapter provider can set these configuration properties. However, if a configuration property is not set, the person deploying the resource adapter can be responsible for providing a value for the property. An Implementation can allow a user to set configuration properties through the use of a map-config-property element in the implementation-ra.xml deployment descriptor file. To configure a set of configuration properties for a resource adapter, a map-config-property-name and map-config-property-value pair can be specified for each configuration property to declare.

A map-config-property element can also be used to override the values specified in the ra.xml deployment descriptor file. At startup, the application server can compare the values of map-config-property against the values of config-property in the ra.xml file. If the configuration property names match, the application server can use the map-config-property-value for the corresponding configuration property name.

In addition to the connection management requirements stated in the J2EE Connector Specification, an Implementation can provide additional settings and services to configure and automatically maintain the size of the connection pool. These settings and services can be used to minimizing the run-time performance cost associated with creating managed connections, for example.

Creating managed connections, or ManagedConnections, can be expensive depending on the complexity of the Enterprise Information System (EIS) that the ManagedConnection is representing. As a result, a user may decide to populate the connection pool with an initial number of ManagedConnections upon startup of the application server, thereby avoiding the need to create the ManagedConnections at run time. This setting can be configured using an initial-capacity element in the implementation-ra.xml descriptor file. The default value for this element can be, for example, 1 ManagedConnection.

As stated in the J2EE Connector Specification, when an application component requests a connection to an EIS through the resource adapter, the application server can first try to match the type of connection being requested with any existing and available ManagedConnection in the connection pool. However, if a match is not found, a new ManagedConnection may be created to satisfy the connection request.

An Implementation can provide a setting to allow a number of additional ManagedConnections to be created automatically when a match is not found. This feature provides the flexibility to control connection pool growth over time, as well as the performance hit on the server each time this growth occurs. This setting can be configured using the capacity-increment element in the implementation-ra.xml descriptor file. The default value can be 1 ManagedConnection, for example.

Since no initiating security principal or request context information is known at application server startup, the initial ManagedConnections, configured with initial-capacity, can be created with a default security context containing a default subject and a client request information of null. When additional ManagedConnections are created that are configured with capacity-increment, the first ManagedConnection can be created with the known initiating principal and client request information of the connection request. The remaining ManagedConnections can be created, up to the capacity-increment limit, using the same default security context used when creating the initial ManagedConnections.

As more ManagedConnections are created over time, the amount of system resources that each ManagedConnection consumes increases. These system resources can include, for example, memory and disk space. Depending on the EIS, this amount can affect the performance of the overall system. To control the effects of ManagedConnections on system resources, an Implementation can allow a user to configure a setting for the allowed maximum number of allocated ManagedConnections.

This setting can be configured using the maximum-capacity element in the implementation-ra.xml descriptor file. If a new ManagedConnection needs to be created during a connection request, or multiple ManagedConnections in the case of capacity-increment being greater than one, the Implementation can ensure that no more than the maximum number of allowed ManagedConnections are created. If the maximum number is reached, the application server can attempt to recycle a ManagedConnection from the connection pool. If there are no connections to recycle, a warning can be logged indicating that the attempt to recycle failed and that the connection request can only be granted for the amount of connections up to the allowed maximum amount. The default value for maximum-capacity can be 10 ManagedConnections, for example.

Although setting the maximum number of ManagedConnections can prevent the server from becoming overloaded by more allocated ManagedConnections than it can handle, it does not control the efficient amount of system resources needed at any given time. An Implementation on an application server can provide a service that monitors the activity of ManagedConnections in the connection pool during the deployment of a resource adapter. If the usage decreases and remains at this level over a period of time, the size of the connection pool can be reduced to an efficient amount necessary to adequately satisfy ongoing connection requests.

This system resource usage service can be turned on by default. In order to turn off this service, the shrinking-enabled element in the implementation-ra.xml descriptor file can be set to false. The shrink-period-minutes element in the implementation-ra.xml descriptor file can be used to set the frequency with which the application server calculates the need for connection pool size reduction and, if reduction is needed, selectively removes unused ManagedConnections from the pool. The default value of this element can be any appropriate value, such as 15 minutes.

Once the application component has completed its use of the EIS connection, it can send a close connection request. At this point, the application server can be responsible for any necessary cleanup, as well as making the connection available for a future connection request. However, if the application component fails to close the connection, the connection pool can exhausted of its available connections and future connection requests can fail.

An Implementation can provide a service to prevent the above scenario by automatically closing a ManagedConnection that has exhausted its usage time. The usage time can be set using the connection-duration-time element in the implementation-ra.xml descriptor file. The connection-cleanup-frequency element can also be used to set the frequency with which the application server calculates the usage time of the currently used ManagedConnections and closes those that have exceeded their usage time.

To turn off the connection leak detection service, the connection-cleanup-frequency element can be set to a value such as to −1. By default, this service can be turned off. The unit used in these element values can be any appropriate unit, such as seconds.

Client Considerations

A client API used by application components for EIS access can be specific to the type of resource adapter and the underlying EIS. An example of such an EIS-specific client API is JDBC for relational databases. The CCI is a common client API for accessing EISes. The CCI is targeted towards Enterprise Application Integration (EAI) and enterprise tool vendors. The J2EE Connector Architecture defines a Common Client Interface (CCI) for EIS access. The CCI defines a standard client API for application components that enables application components and EAI frameworks to drive interactions across heterogeneous EISes.

A connection factory is a public interface that enables connection to an EIS instance. A ConnectionFactory interface can be provided by a resource adapter. An application can look up a Connection Factory instance in the JNDI namespace and use it to obtain EIS connections. One goal of the J2EE Connector Architecture is to support a consistent application programming model across both CCI and EIS-specific client APIs. This model can be achieved through use of a design pattern, specified as an interface template, for both the ConnectionFactory and Connection interfaces.

It is often necessary to obtain a connection in a managed application. Certain tasks are performed when a managed application obtains a connection to an EIS instance from a ConnectionFactory, as specified in the res-type variable. The application assembler or component provider specifies the connection factory requirements for an application component by using a deployment descriptor mechanism. For example:

```
res-ref-name: eis/myEIS
res-type: javax.resource.cci.ConnectionFactory
res-auth: Application or Container
```

The person deploying the resource adapter sets the configuration information for the resource adapter. The application server can use a configured resource adapter to create physical connections to the underlying EIS. The application component looks up a connection factory instance in the component's environment by using the JNDI interface. A JNDI lookup can be performed, such as:

```
//obtain the initial JNDI Naming context
Context initctc = new InitialContext ( );
// perform JNDI lookup to obtain the connection factory
javax.resource.cci.ConnectionFactory cxf =
        (javax.resource.cci.ConnectionFactory)
                initctx.lookup ("java:comp/env/eis/MyEI
                S");
```

The JNDI name passed in the method NamingContext.lookup is the same as that specified in the res-ref-name element of the deployment descriptor. The JNDI lookup results in a connection factory instance of type java.resource.cci.ConnectionFactory as specified in the res-type element.

The application component can invoke the getConnection method on the connection factory to obtain an EIS connection. The returned connection instance can represent an application level handle to an underlying physical connection. An application component can obtain multiple connections by calling the method getConnection on the connection factory multiple times. The application component can use the returned connection to access the underlying EIS. After the component finishes with the connection, it closes the connection using the close method on the Connection interface.

If an application component fails to close an allocated connection after its use, that connection can be considered to be an unused connection. The application server can manage the cleanup of unused connections. When a container terminates a component instance, the container can clean up all connections used by that component instance.

In a non-managed application scenario, the application developer must follow a similar programming model to that of a managed application. Non-management involves lookup of a connection factory instance, obtaining an EIS connection, using the connection for EIS access, and finally closing the connection. Certain tasks are performed when a non-managed application obtains a connection to an EIS instance from a ConnectionFactory. First, the application client can calls a method on an instance such as a javax.resource.cci.ConnectionFactory instance, returned from the JNDI lookup, to get a connection to the underlying EIS instance.

The ConnectionFactory instance can delegate the connection request from the application to the default ConnectionManager instance. The resource adapter can provide the default ConnectionManager implementation. The ConnectionManager instance can create a new physical connection to the underlying EIS instance by calling a method such as ManagedConnectionFactory.createManagedConnection. The ManagedConnectionFactory instance can handle the createManagedConnection method by creating a new physical connection to the underlying EIS, represented by a ManagedConnection instance. The ManagedConnectionFactory can use the security information, which can be passed as a Subject instance, any ConnectionRequestInfo, and its configured set of properties such as port number and server name to create a new ManagedConnection instance.

The ConnectionManager instance calls the ManagedConnection.getConnection method to get an application-level connection handle. Calling the getConnection method does not necessarily create a new physical connection to the EIS instance. Calling getConnection can produce a temporary handle that is used by an application to access the underlying physical connection. The actual underlying physical connection is represented by a ManagedConnection instance. The ConnectionManager instance returns the connection handle to the ConnectionFactory instance, which then returns the connection to the application that initiated the connection request.

Managing JDBC Connectivity

Database connectivity can be configured and managed through JDBC components, such as data sources, connection pools and MultiPools, for both local and distributed transactions. An Administration Console can provide an interface to the tools that allow a user to configure and manage application server features, including JDBC (database connectivity with Java). For most JDBC administrative functions, which can include creating, managing and monitoring connectivity, systems administrators use an Administrative Console or the command-line interface. Application developers may want to use the JDBC API.

Frequently performed tasks to set and manage connectivity can include: (1) Defining the attributes that govern JDBC connectivity between the application server and a database management system, (2) managing established connectivity, and (3) monitoring established connectivity.

A Connection Pool can contain named groups of JDBC connections that are created when the Connection Pool is registered, usually when starting up the application server. An application can borrow a connection from the pool, use the connection, then returns the connection to the pool by closing the connection. All of the settings made with an Administration Console can be static. This means that all settings can be made before the application server starts. Dynamic Connection Pools can be created after the server starts, such as by using a command line or programmatically using an API.

MultiPools can be used in local, or non-distributed, transactions on single or multiple application server configurations. MultiPools can aid in load balancing and high availability, for example. For load balancing, pools can be added without any attached ordering, and can be are accessed using a distributed consensus scheme such as round-robin. When switching connections, the Connection Pool following the last pool accessed can be selected. For high availability, pools can be set up as an ordered list that determines the order in which Connection Pool switching occurs. For example, the first pool on the list can be selected, followed by the second, and so on. All of the connections in a particular Connection Pool can be identical, being attached to a single database. The Connection Pools within a MultiPool may, however, be associated with different DBMS.

A Data Source object can enable JDBC clients to obtain a DBMS connection. Each Data Source object can point to a Connection Pool or MultiPool. Data Source objects can be defined with or without JTA, which provides support for distributed transactions. TxData Sources may not be able to point to MultiPools, only Connection Pools, because MultiPools may not be supported in distributed transactions.

JDBC Configuration

To set up JDBC connectivity, a user can configure Connection Pools, Data Source objects, and MultiPools, if needed, by defining attributes in an Administration Console and, for dynamic connection pools, at the command line. There are at least three types of transactions: a local or non-distributed transaction, a distributed transaction with an XA Driver that can utilize a two-phase commit, and a distributed transaction with a non-XA Driver that has a single resource manager and single database instance.

Once connectivity is established, either an Administration Console or command-line interface can be used to manage and monitor connectivity. Configuration can involve creating and assigning JDBC Objects. The JDBC components, such as Connection Pools, Data Sources, and MultiPools, can be created by specifying attributes and database properties using, for example, and Administration Console.

The connection pool or MultiPool can be created first, followed by the Data Source. When creating a Data Source object, a connection pool or MultiPool can be specified as one of the Data Source attributes. This permanently associates that Data Source with a specific Connection Pool or MultiPool ("pool"). Once the Data Source and associated Connection Pool (or MultiPool) are configured, each object can be assigned to the same servers or clusters. For example involving a server cluster, the Data Source can be assigned to the cluster, and the associated Connection Pool can be assigned to each managed server in the cluster. In a single server configuration, each Data Source and its associated Connection Pool can be assigned to the server. In a MultiPool situation, the Connection Pools can be assigned to the MultiPool, and the Data Source, all Connection Pools, and the MultiPool assigned to the server(s) or cluster(s).

Relevant in single-server configurations, JDBC MultiPools can provide backup pools and load balancing to enhance database connectivity. A MultiPool is a "pool of pools" that allows a configurable algorithm for choosing among its list of pools, the pool that will be selected to provide the connection. MultiPools do not necessarily apply to multiple-server configurations.

implementation-ra.xml file

If a resource adapter .rar does not contain an application server-specific XML file, such as an implementation-ra.xml file, the application server can automatically generate such a file. The contents and arrangement of elements in the XML files can conform to the Document Type Definition (DTD) for each file in use. Application server utilities can ignore the DTDs embedded within the DOCTYPE header of XML deployment files, and instead can use DTD locations installed along with the server. However, the DOCTYPE header information must include a valid URL syntax in order to avoid parser errors.

The public DTD locations for XML deployment files used with an application server can include "connector__1__0.dtd", which can contain the DTD for the standard ra.xml deployment file, required for all resource adapters. This DTD can be maintained as part of the J2EE Connector Specification. An "implementation-ra.dtd" can contain the DTD used for creating implementation-ra.xml, which defines resource adapter properties used for deployment to the application server.

An example of an implementation-ra.xml DTD is as follows:

```
DTD for implementation-ra.xml
<!- -
XML DTD for Implementation Specific Resource Adapter
deployment descriptor 1.0
- ->
<!- -
```

This DTD defines the application server-specific deployment information for defining a deployable Resource Adapter Connection Factory. It provides for complete specification of all configurable Connection Factory parameters including Connection Pool parameters, Security parameters for Resource Principal Mapping and the ability to define values for configuration parameters which exist in the ra.xml deployment descriptor.

```
- ->
<!- -
```

The implementation-connection-factory-dd element is the root element of the application server-specific deployment descriptor for the deployed resource adapter.

```
- ->
    <!ELEMENT implementation-connection-factory-dd
(connection-factory-name, description?, jndi-name, ra-link-
ref?, native-libdir?, pool-params?, logging-enabled?, log-
filename?, map-config-property*, security-principal-map?)>
<!- -
```

The connection-factory-name element defines that logical name that will be associated with this specific deployment of the Resource Adapter and its corresponding Connection Factory.

The value of connection-factory-name can be used in other deployed Resource Adapters via the ra-link-ref element. This will allow multiple deployed Connection Factories to utilize a common deployed Resource Adapter, as well as share configuration specifications. This can be a required element.

```
- ->
<!ELEMENT connection-factory-name (#PCDATA)>
<!- -
```

The description element is used to provide text describing the parent element. The description element should include any information that the deployer wants to describe about the deployed Connection Factory. This is an optional element.

```
- ->
<!ELEMENT description (#PCDATA)>
<!- -
```

The jndi-name element defines the name that will be used to bind the Connection Factory Object into the Implementation JNDI Namespace. Client EJBs and Servlets will use this same JNDI in their defined Reference Descriptor elements of the implementation specific deployment descriptors. This can be a required element.

```
- ->
<!ELEMENT jndi-name (#PCDATA)>
<!- -
```

The ra-link-ref element allows for the logical association of multiple deployed Connection Factories with a single deployed Resource Adapter. The specification of the optional ra-link-ref element with a value identifying a separately deployed Connection Factory results in this newly deployed Connection Factory sharing the Resource Adapter, which had been deployed with the referenced Connection Factory. In addition, any values defined in the referred Connection Factories deployment will be inherited by this newly deployed Connection Factory unless specified. This is an optional element.

```
- ->
<!ELEMENT ra-link-ref (#PCDATA)>
<!- -
```

The native-libdir element identifies the directory location to be used for all native libraries present in this resource adapter deployment. As part of deployment processing, all encountered native libraries will be copied to the location specified. It is the responsibility of the Administrator to perform the necessary platform actions such that these libraries will be found during application server runtime. This can be a required element if native libraries are present.

```
- ->
<!ELEMENT native-libdir (#PCDATA)>
<!- -
```

The pool-params element is the root element for providing Connection Pool specific parameters for this Connection Factory. The application server can use these specifications in controlling the behavior of the maintained pool of Managed Connections. This is an optional element. Failure to specify this element or any of its specific element items will result in default values being assigned. Refer to the description of each individual element for the designated default value.

```
-->
<!ELEMENT pool-params (initial-capacity?, max-capacity?, capacity-increment?, shrinking-enabled?,
shrink-period-minutes?, connection-cleanup-frequency?,
connection-duration-time?)>
<!--
```

The initial-capacity element identifies the initial number of managed connections, which the application server will attempt to obtain during deployment. This is an optional element. Failure to specify this value can result in the application server using a defined default value such as 1.

```
-->
<!ELEMENT initial-capacity (#PCDATA)>
<!--
```

The max-capacity element identifies the maximum number of managed connections, which the application server will allow. Requests for newly allocated managed connections beyond this limit will result in a ResourceAllocationException being returned to the caller. This is an optional element. Failure to specify this value can result in the application server using a defined default value such as 10.

```
-->
<!ELEMENT max-capacity (#PCDATA)>
<!--
```

The capacity-increment element identifies the number of additional managed connections, which the application server will attempt to obtain during resizing of the maintained connection pool. This is an optional element. Failure to specify this value can result in the application server using its defined default value such as 1.

```
-->
<!ELEMENT capacity-increment (#PCDATA)>
<!--
```

The shrinking-enabled element indicates whether or not the Connection Pool should have unused Managed Connections reclaimed as a means to control system resources. This is an optional element. Failure to specify this value will result in the application server using its defined default value of true for a value range of true or false.

```
-->
<!ELEMENT shrinking-enabled (#PCDATA)>
<!--
```

The shrink-period-minutes element identifies the amount of time the Connection Pool Management will wait between attempts to reclaim unused Managed Connections. This is an optional element. Failure to specify this value can result in the application server using a defined default value, such as 15.

```
-->
<!ELEMENT shrink-period-minutes (#PCDATA)>
<!--
```

The connection-cleanup-frequency element identifies the amount of time (in seconds) the Connection Pool Management will wait between attempts to destroy Connection handles which have exceeded their usage duration. This element, used in conjunction with connection-duration-time, prevents connection leaks when an Application may have not closed a connection after completing usage. This is an optional element. Failure to specify this value can result in the application server using a defined default value, such as −1.

```
-->
<!ELEMENT connection-cleanup-frequency (#PCDATA)>
<!--
```

The connection-duration-time element identifies the amount of time (in seconds) a Connection handle can be active. This element, used in conjunction with connection-cleanup-frequency, prevents leaks when an Application may have not closed a connection after completing usage. This is an optional element. Failure to specify this value can result in the application server using a defined default value such as −1.

```
-->
<!ELEMENT connection-duration-time (#PCDATA)>
<!--
```

The logging-enabled element indicates whether or not the log writer is set for either the ManagedConnectionFactory or ManagedConnection. If this element is set to true, output generated from either the ManagedConnectionFactory or ManagedConnection will be sent to the file specified by the log-filename element. This is an optional element. Failure to specify this value can result in the application server using its defined default value such as false for a value range of true or false.

```
-->
<!ELEMENT logging-enabled (#PCDATA)>
<!--
```

The log-filename element specifies the name of the log file which output generated from either the ManagedConnectionFactory or a ManagedConnection are sent. The full address of the filename is required. This is an optional element.

```
-->
<!ELEMENT log-filename (#PCDATA)>
<!--
```

Each map-config-property element identifies a configuration property name and value that corresponds to an ra.xml config-entry element with the corresponding config-property-name. At deployment time, all values present in a map-config-property specification will be set on the ManagedConnectionFactory. Values specified via a map-config-property will supersede any default value that may have been specified in the corresponding ra.xml config-entry element. This is an optional element.

```
-->
<!ELEMENT map-config-property (map-config-property-name, map-config-property-value)>
<!ELEMENT map-config-property-name (#PCDATA)>
<!ELEMENT map-config-property-value (#PCDATA)>
<!--
```

Each security-principal-map element provides a mechanism to define appropriate Resource Principal values for Resource Adapter/EIS authorization processing, based upon the known Implementation Runtime Initiating Principal. This map allows for the specification of a defined set of Initiating Principals and the corresponding Resource Principal's Username and Password that should be used when allocating Managed Connections and Connection Handles. A default Resource Principal can be defined for the Connection Factory via the map. By specifying an initiating-principal value of '*' and a corresponding resource-principal, the defined resource-principal will be utilized whenever the current identity is NOT matched elsewhere in the map. This is an optional element, however, it must be specified in some form if Container Managed Sign-on is supported by the Resource Adapter and used by ANY client. In addition, the deployment-time population of the Connection Pool with Managed Connections will be attempted using the defined 'default' resource principal if one is specified.

```
-->
<!ELEMENT security-principal-map (map-entry*)>
<!ELEMENT map-entry (initiating-principal+, resource-principal)>
<!ELEMENT initiating-principal (#PCDATA)>
<!ELEMENT resource-principal (resource-username, resource-password)>
<!ELEMENT resource-username (#PCDATA)>
<!ELEMENT resource-password (#PCDATA)>
```

implementation-ra.xml Element Hierarchy

Figure 3:
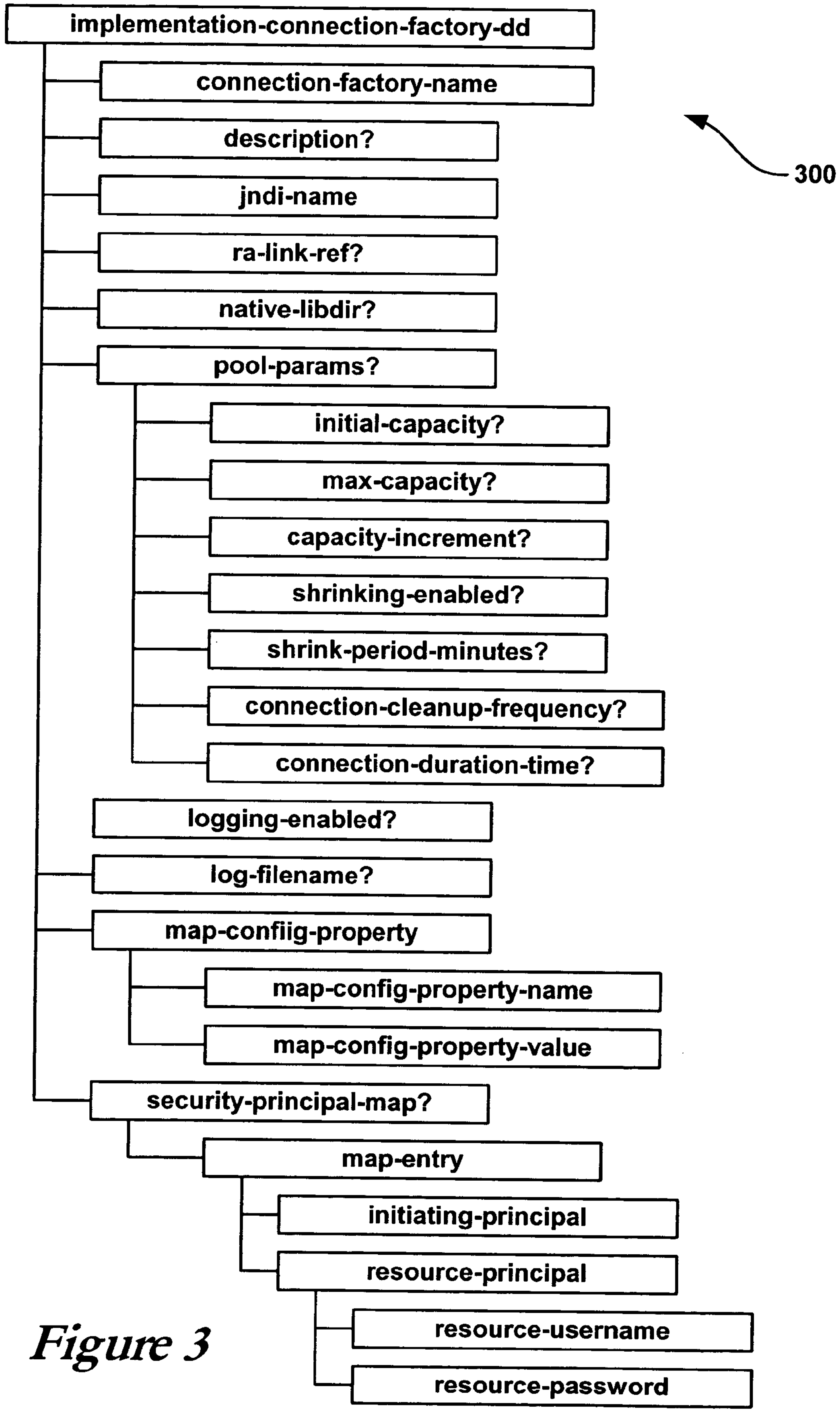
FIG. 3 is a diagram of the structure of an application-server specific deployment descriptor that can be used with the implementation of FIG. 1.

FIG. 3 summarizes the structure, or hierarchy 300, of an implementation-ra.xml deployment descriptor that can be used with systems and methods in accordance with the present invention. The following sections describe some of the elements of this hierarchy that can be defined in the implementation-ra.xml file.

implementation-connection-factory-dd—(can be required)—the root element of the Implementation-specific deployment descriptor for the deployed resource adapter.

connection-factory-name—(can be required)—defines the logical name that will be associated with this specific deployment of the resource adapter and its corresponding connection factory. The value of this element can be used in other deployed resource adapters through the ra-link-ref element, allowing multiple deployed Connection Factories to utilize a common deployed resource adapter, as well as share configuration specifications.

description—(optional)—provides text describing the parent element. This element should include any information that the deployer wants to describe about the deployed Connection Factory.

indi-name—(can be required)—defines the name that will be used to bind the Connection Factory Object into the application server JNDI Namespace. Client EJBs and Servlets use the same JNDI in their defined Reference Descriptor elements of the implementation-specific deployment descriptors.

ra-link-ref—(optional)—allows for the logical association of multiple deployed connection factories with a single deployed resource adapter. The specification of the optional ra-link-ref element with a value identifying a separately deployed connection factory will result in this newly deployed connection factory sharing the resource adapter that has been deployed with the referenced connection factory. In addition, any values defined in the referred connection factories deployment will be inherited by this newly deployed connection factory unless specified.

native-libdir—(can be required if native libraries present)—identifies the directory location to be used for all native libraries present in this resource adapter deployment. As part of deployment processing, all encountered native libraries will be copied to the location specified. It is the responsibility of the administrator to perform the necessary platform actions such that these libraries will be found during application server run time.

pool-params—(optional)—the root element for providing connection pool-specific parameters for this connection factory. An application server can use these specifications in controlling the behavior of the maintained pool of managed connections. Failure to specify this element or any of its specific element items can result in default values being assigned.

initial-capacity—(optional)—identifies the initial number of managed connections, which an application server can attempt to obtain during deployment. Failure to specify this value will result in the application server using a defined default value such as 1.

max-capacity—(optional)—identifies the maximum number of managed connections that an application server will allow. Requests for newly allocated managed connections beyond this limit results in a ResourceAllocationException being returned to the caller. Failure to specify this value will result in the application server using a defined default value such as 10.

capacity-increment—(optional)—identifies the maximum number of additional managed connections that an application server can attempt to obtain during resizing of the maintained connection pool. Failure to specify this value can result in the application server using a defined default value such as 1.

shrinking-enabled—(optional)—indicates whether or not the connection pool should have unused managed connections reclaimed as a means to control system resources. Failure to specify this value can result in an application server using a defined default value such as true for a value range of true or false.

shrink-period-minutes—(optional)—identifies the amount of time the connection pool manager will wait between attempts to reclaim unused managed connections. Failure to specify this value can result in the application server using a defined default value such as 15.

connection-cleanup-frequency—(optional)—identifies the amount of time the connection pool management will wait between attempts to destroy connection handles which have exceeded their usage duration. This element, used in conjunction with connection-duration-time, prevents connection leaks when an application may have not closed a connection after completing usage. Failure to specify this value can result in the application server using a defined default value such as −1.

connection-duration-time—(optional)—identifies the amount of time a connection can be active. This element, used in conjunction with connection-cleanup-frequency, prevents leaks when an application may have not closed a connection after completing usage. Failure to specify this value can result in the application server using a defined default value such as −1.

logging-enabled—(optional)—indicates whether or not the log writer is set for either the ManagedConnectionFactory or ManagedConnection. If this element is set to true, output generated from either the ManagedConnectionFactory or ManagedConnection will be sent to the file specified by the log-filename element. Failure to specify this value can result in the application server using a defined default value such as false for a value range of true or false.

log-filename—(optional)—specifies the name of the log file from which output generated from the ManagedConnectionFactory or a ManagedConnection is sent. The full address of the filename can be required.

map-config-property—(optional, zero or more)—identifies a configuration property name and value that corresponds to an ra.xml config-entry element with the corresponding config-property-name. At deployment time, all values present in a map-config-property specification can be set on the ManagedConnectionFactory. Values specified via a map-config-property will supersede any default value that may have been specified in the corresponding ra.xml config-entry element.

map-config-property-name—(optional)—identifies a name that corresponds to an ra.xml config-entry element with the corresponding config-property-name.

map-config-property-value—(optional)—identifies a value that corresponds to an ra.xml config-entry element with the corresponding config-property-name.

security-principal-map—(optional)—provides a mechanism to define appropriate resource-principal values for resource adapter and EIS authorization processing, based upon the known Implementation run time initiating-principal. This map allows for the specification of a defined set of initiating principals and the corresponding resource principal's username and password that should be used when allocating managed connections and connection handles. A default resource-principal can be defined for the connection factory via the map. By specifying an initiating-principal value of '*' and a corresponding resource-principal, the defined resource-principal can be utilized whenever the current identity is not matched elsewhere in the map. This is an optional element, however, it must be specified in some form if container managed sign-on is supported by the resource adapter and used by any client. In addition, the deployment-time population of the connection pool with managed connections will be attempted using the defined 'default' resource principal if one is specified.

map-entry—identifies an entry in the security-principal-map.

initiating-principal (optional, zero or more)

resource-principal—(optional)—can be defined for the connection factory via the security-principal-map. By specifying an initiating-principal value of '*' and a corresponding resource-principal, the defined resource-principal will be utilized whenever the current identity is not matched elsewhere in the map.

resource-username—(optional)—username identified with the resource-principal. Used when allocating managed connections and connection handles.

resource-password—(optional)—password identified with the resource-principal. Used when allocating managed connections and connection handles.

Terms and Concepts

The following terms and concepts are among those used in the description that might benefit from further definition:

Common client interface (CCI)—defines a standard client API for application components and enables application components and Enterprise Application Integration (EAI) frameworks to drive interactions across heterogeneous EISes using a common client API. The J2EE Connector Architecture defines a CCI for EIS access.

Container—part of an application server that provides deployment and run-time support for application components. A container allows you to monitor and manage supported components as well as the service(s) that monitor and manage the components. Containers can include connector containers that host resource adapters; Web containers that host JSP, servlets, and static HTML pages; EJB containers that host EJB components; and application client containers that host standalone application clients.

Enterprise Information System (EIS) resource—provides EIS-specific functionality to its clients. Examples include a record or set of records in a database system, a business object in an Enterprise Resource Planning (ERP) System, and a transaction program in a transaction processing system.

Enterprise Information System (EIS)—provides the information infrastructure for an enterprise. An EIS offers a set of services to its clients. These services are exposed to clients as local and/or remote interfaces. Examples of an EIS include an ERP system, a mainframe transaction processing system, and a legacy database system.

J2EE Connector—See Resource Adapter.

J2EE Connector Architecture—an architecture for integration of J2EE-compliant application servers with enterprise information systems (EISes). There are two parts to this architecture: an EIS vendor-provided resource adapter and an application server, such as WebLogic Server, to which the resource adapter plugs in. This architecture defines a set of contracts, such as transactions, security, and connection management, that a resource adapter has to support to plug in to an application server. The J2EE Connector Architecture also defines a Common Client Interface (CCI) for EIS access. The CCI defines a client API for interacting with heterogeneous EISes.

Managed environment-defines an operational environment for a J2EE-based, multi-tier, Web-enabled application that accesses EIS. The application consists of one or more application components, such as EJBs, JSPs, and servlets, which are deployed on containers. These containers can include Web containers that host JSP, servlets, and static HTML pages; EJB containers that host EJB components; and application client containers that host standalone application clients.

Non-managed environment-defines an operational environment for a two-tier application. An application client can directly use a resource adapter to access the EIS. The EIS defines the second tier for a two-tier application.

.rar file-resource adapter archive. A compressed (zip) file used to load classes and other files required to run a resource adapter.

ra.xml file—describes the resource adapter-related attributes type and its deployment properties using a standard DTD.

Resource adapter-a system-level software driver used by an application server to connect to an EIS. A resource adapter serves as the "J2EE connector." The Implementation of the J2EE Connector Architecture supports resource adapters developed by EIS vendors and third-party application developers that can be deployed in any application server supporting the J2EE Platform Specification. Resource adapters contain the Java, and if necessary, the native components required to interact with the EIS.

Resource manager-part of an EIS that manages a set of shared EIS resources. Examples of resource managers include a database system, a mainframe TP system, and an ERP system. A client requests access to a resource manager in order to use its managed resources. A transactional resource manager can participate in transactions that are externally controlled and coordinated by a transaction manager. In the context of the J2EE Connector Architecture, clients of a resource manager can include middle-tier application servers and client-tier applications. A resource manager is typically a different address space or on a different machine from the client that accesses it.

Service provider interface (SPI)—contains the objects that provide and manage connectivity to the EIS, establish transaction demarcation, and provide a framework for event listening and request transmission. All J2EE Connector Architecture-compliant resource adapters provide an implementation for these interfaces in the javax.resource.spi package.

System contract—a mechanism by which connection requests are passed between entities. To achieve a standard system-level pluggability between application servers and EISes, the Connector Architecture defines a standard set of system-level contracts between an application server and an EIS. The EIS side of these system-level contracts is implemented in a resource adapter.

implementation-ra.xml file—adds additional application-server-specific deployment information to the ra.xml file.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

What is claimed is:

1. A computer readable storage medium storing instructions for improved implementation of a J2EE connector architecture on an application server, the instructions comprising:

a resource adapter for an Enterprise Information System;

a set of system-level contracts between the resource adapter and an application server;

a Common Client Interface capable of providing a client API for Java applications and development tools to access the resource adapter;

a connection manager on the application server capable of managing and maintaining size of a pool of connections to the Enterprise Information System, wherein the connection manager matches a request for a new connection to the Enterprise Information System, through the resource adapter, with an existing and available managed connection in the pool of connections, and wherein the connection manager creates a plurality of managed connections when an existing and available managed connection is not found, wherein the connection manager creates each of the plurality of managed connections using an initiating principal and client request information contained in the request for a new connection;

a set of packaging and development interfaces that provide the ability for resource adapters to plug into J2EE applications in a modular manner; and a deployment descriptor containing a configuration element for the resource adapter, the configuration element allowing a user to override default deployment values for the resource adapter.

2. A computer readable storage medium according to claim 1, further comprising:

a deployment component adapted to automatically detect and deploy a resource adapter on the application server.

3. A computer readable storage medium according to claim 1, wherein:

the resource adapter further provides support for error logging and tracing.

4. A computer readable storage medium according to claim 3, wherein the deployment descriptor contains a logging-enabled element capable of indicating whether logging is enabled, as well as a log-filename element capable of specifying the name of the file in which to write the logging information.

5. A computer readable storage medium according to claim 1, wherein the connection manager enables the resource adapter to provide services specific to the resource adapter, the services being selected from the group consisting of connection pooling, error logging and tracing, and security management.

6. A computer readable storage medium according to claim 5, wherein:

the connection manager can create physical connections to the Enterprise Information System and the resource adapter is capable of having more than one connection manager instance per physical connection.

7. A computer readable storage medium according to claim 5, wherein the deployment descriptor specific to the resource adapter allows the resource adapter to be linked to a second resource adapter, the resource adapter capable of sharing resources with the second resource adapter, thereby preventing the duplication of resources and only requiring the resource adapter to modify a subset of resource adapter attributes.

8. A computer readable storage medium according to claim 1, wherein the set of system-level contracts includes a connection management contract and the deployment descriptor contains connection pool parameters capable of setting parameters selected from the group consisting of: the initial number of managed connections the application server attempts to allocate at deployment time, the maximum number of managed connections the application server allows to be allocated at any one time, the number of managed connections the application server attempts to allocate when filling a request fore new connection, whether the application server attempts to reclaim unused managed connections to save system resources, the time the application server waits between attempts to reclaim unused managed connections, the frequency of time to detect and reclaim connections that have exceeded their usage time, and the amount of usage time allowed for a connection.

9. A computer readable storage medium according to claim 1 wherein the deployment descriptor for the resource adapter contains an initiating principal mapping, the mapping capable of being used at deployment time if connection pool parameters indicate that the application server should initialize connections.

10. A computer readable storage medium according to claim 1, further comprising:

a security principal map for each deployed resource adapter, the map providing a mechanism to define appropriate resource principal values for resource adapter and Enterprise Information System sign-on processing.

11. A computer readable storage medium according to claim 1, wherein:

the connection manager attempts to recycle a managed connection from the connection pool if a maximum number of connections is reached.

12. A computer readable storage medium according to claim 1, wherein:

the connection manager monitors the activity of managed connections in the connection pool during the deployment of a resource adapter, the connection manager being capable of reducing the size of the connection pool if connection usage decreases and remains at the decreased level over a period of time.

13. A computer readable storage medium according to claim 12, wherein an element in the deployment descriptor sets the frequency for calculating connection pool size reduction.

14. A computer readable storage medium according to claim 1, wherein:

the connection manager automatically closes a managed connection that has exhausted its usage time.

15. A computer readable storage medium according to claim 14, wherein an element in the deployment descriptor sets the frequency for calculating whether a connection has exceeded its usage time.

16. A computer readable storage medium according to claim 14, wherein an element in the deployment descriptor sets the maximum usage time for a connection.

17. A computer readable storage medium according to claim 1, wherein transaction level type supported by the resource adapter is specified by an element in a deployment descriptor.

18. A computer readable storage medium according to claim 17, wherein transaction level type supported by the resource adapter is specified as XA transaction, local transaction, or no transaction.

19. A computer readable storage medium for improved implementation of a J2EE connector architecture on an application server, comprising:

a resource adapter for an Enterprise Information System;

a deployment descriptor, wherein the deployment descriptor contains a configuration element for the resource adapter, wherein the configuration element allows a user to override default deployment values for the resource adapter;

a connection manager on the application server capable of managing and maintaining size of a pool of connections to the Enterprise Information System, wherein the connection manager matches a request for a new connection to the Enterprise Information System, through the resource adapter, with an existing and available managed connection in the pool of connections, and wherein the connection manager creates a plurality of managed connections when an existing and available managed connection is not found, wherein the connection manager creates each of the plurality of managed connections using an initiating principal and client request information contained in the request for a new connection;

a set of system-level contracts between the resource adapter and an application server, the set including a security management contract;

a password converter tool capable of being used with the security management contract to encrypt any passwords in the deployment descriptor, wherein the password converter tool parses an existing deployment descriptor containing non-encrypted passwords and creates a new deployment descriptor containing encrypted passwords;

a Common Client Interface capable of providing a client API for Java applications and development tools to access the resource adapter; and a set of packaging and development interfaces that provide the ability for resource adapters to plug into J2EE applications in a modular manner.

* * * * *

UNITED STATES PATENT AND TRADEMARK OFFICE

CERTIFICATE OF CORRECTION

PATENT NO. : 7,506,342 B2
APPLICATION NO. : 10/617909
DATED : March 17, 2009
INVENTOR(S) : Mousseau et al.

It is certified that error appears in the above-identified patent and that said Letters Patent is hereby corrected as shown below:

In column 9, line 54, delete "(.rarfile)" and insert -- (.rar file) --, therefor.

In column 11, line 41, delete "windows.dII" and insert -- windows.dll --, therefor.

In column 12, line 51, delete "AdaDter" and insert -- Adapter --, therefor.

In column 12, line 58, delete "ear" and insert -- .ear --, therefor.

In column 12, line 58, delete "war" and insert -- .war --, therefor.

In column 12, line 58, delete "jar" and insert -- .jar --, therefor.

In column 14, line 62, delete "JMS" and insert -- JAAS --, therefor.

In column 29, line 64, after "more)" insert -- . --.

In column 33, line 2, in claim 8, delete "fore" and insert -- for a --, therefor.

Signed and Sealed this

Twenty-fifth Day of May, 2010

David J. Kappos

David J. Kappos
*Director of the United States Patent and Trademark Office*